UNITED STATES PATENT OFFICE.

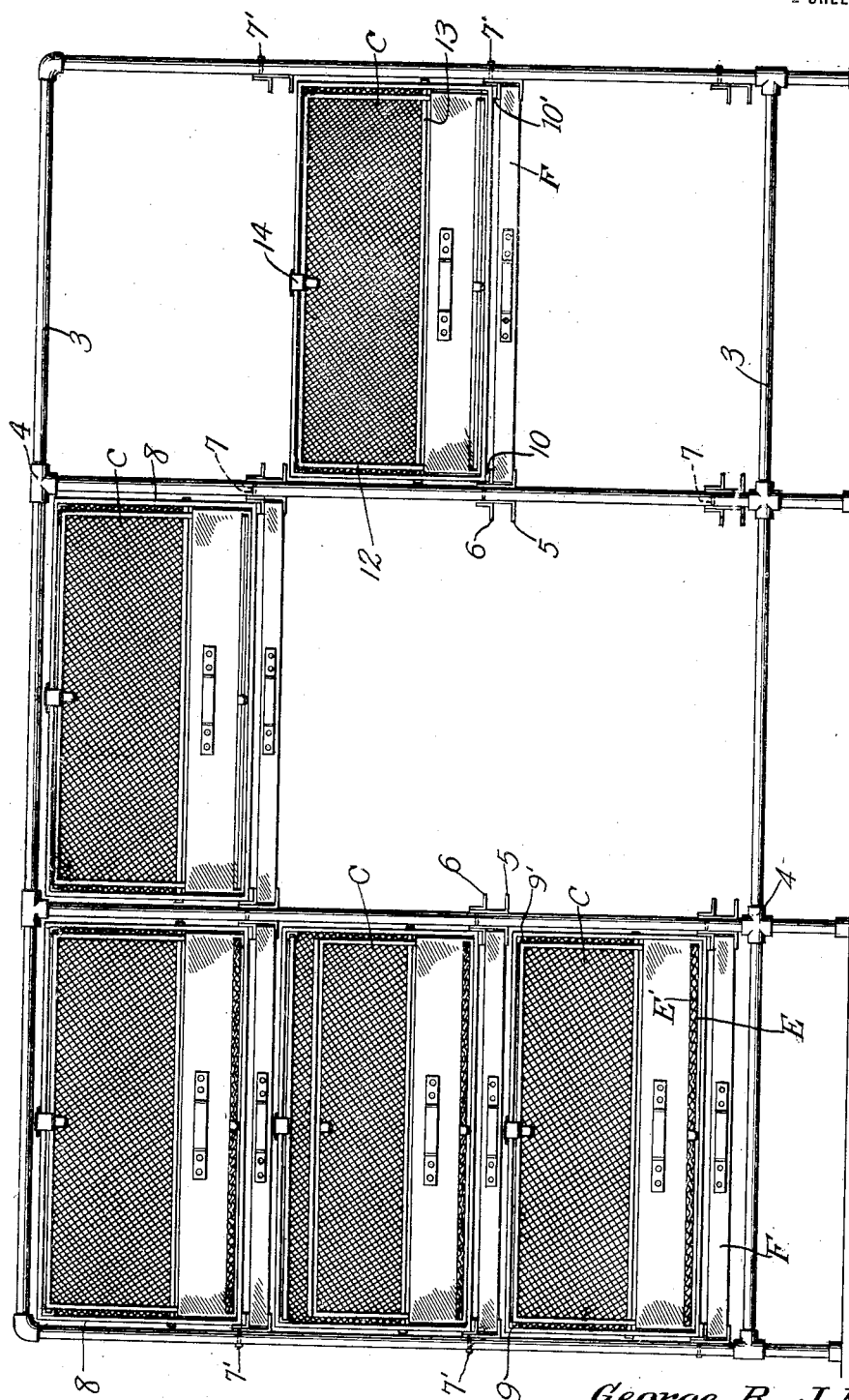

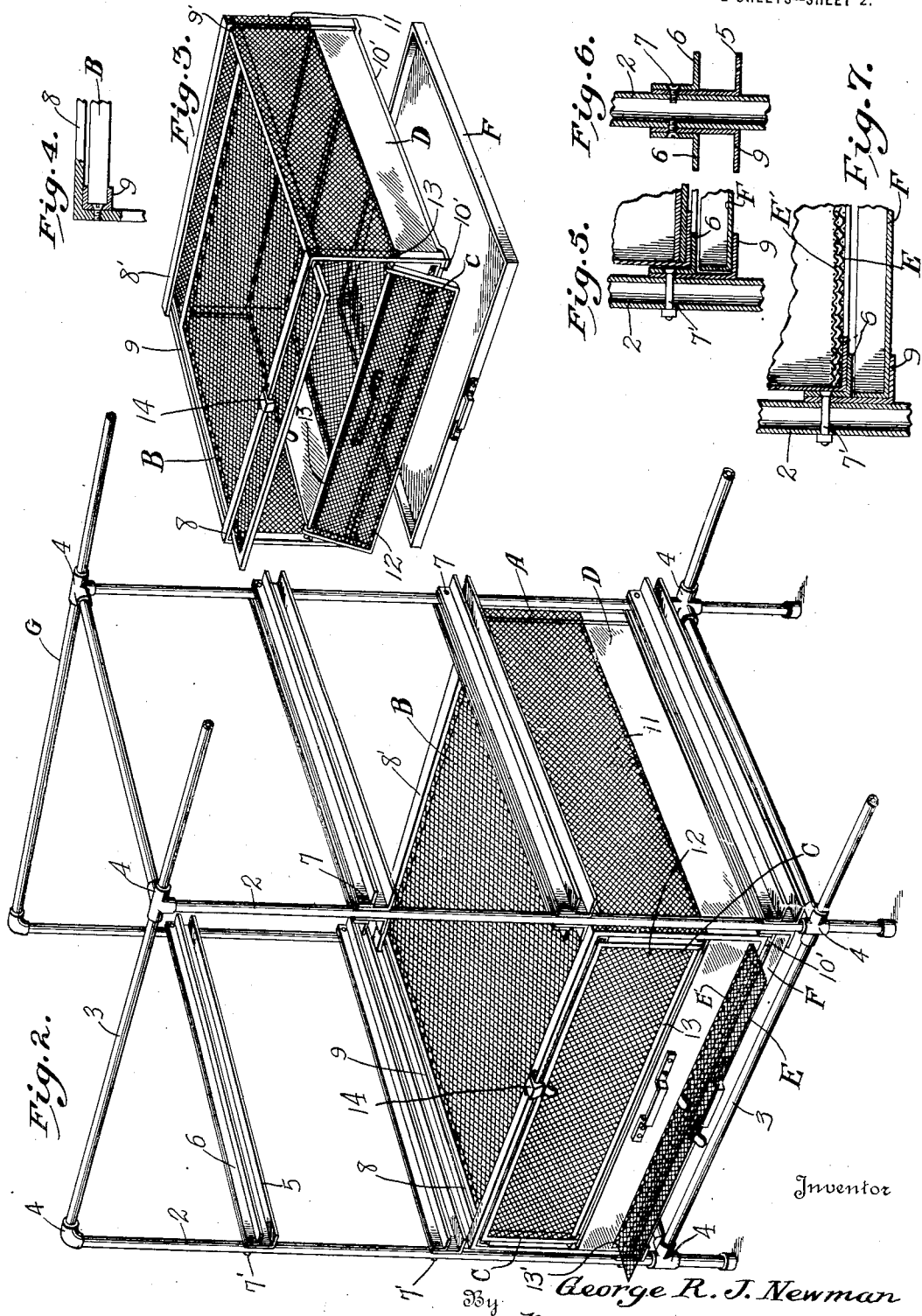

GEORGE R. J. NEWMAN, OF CHERRYDALE, VIRGINIA.

ANIMAL-CAGE.

1,347,397.  Specification of Letters Patent.  Patented July 20, 1920.

Application filed September 27, 1919. Serial No. 326,752.

*To all whom it may concern:*

Be it known that I, GEORGE R. J. NEWMAN, citizen of the United States, residing at Cherrydale, in the county of Alexandria and State of Virginia, have invented certain new and useful Improvements in Animal-Cages; and I do hereby declare the following to be a full, clear, and exact description of the invention, such as will enable others skilled in the art to which it appertains to make and use the same.

This invention relates to animal husbandry and particularly to confining and housing devices.

An object of this invention is to provide a simple means for caging animals and a cage that can be made up in sections and quickly and easily assembled and quickly and easily knocked down.

A further object of this invention is to provide a cage that can be taken out without disturbing the support therefor and without disturbing the drip pan beneath the cage, and in order to disinfect, clean or dip the cage in any desired solution for the destruction of vermin, insects, etc., and for such other purposes as it may be desired to subject the inhabitant of the cage, and that the same may be done without lifting but a slight weight and without interfering with the rest of the structure.

A further object of this invention is to provide a cage in which the bottom of the cage may be taken out and cleaned without interfering with the occupant of the cage, and to improve cage bottoms.

A further object of this invention is to provide a simplified means of mounting and receiving a pan for insertion beneath an animal cage and to improve a pan for this purpose.

With these and other objects in view, the invention consists of the construction, combination and in details of construction as hereinafter more fully described and claimed.

In the drawings:

Figure 1 is a front elevation of a few sections of this cage with some of the elements removed.

Fig. 2 is a perspective of a lesser number of section carrying elements showing a single cage with one of the bottoms partly removed.

Fig. 3 is a perspective of a single cage removed and relatively raised from a drip pan.

Fig. 4 is a detail partly in section showing the means for receiving the top to a cage.

Fig. 5 is a detail construction partly broken away showing the mode of construction of the slide for receiving the cage and drip pan.

Fig. 6 is a detail construction partly broken away showing the mode of mounting two such sections.

Fig. 7 is a detail partly in section and partly broken away showing the same as Fig. 5, except that in Fig. 5 the cage is shown with a wood bottom for breeding cages and in Fig. 7 is shown the usual screen bottom.

In detail, the invention consists of a cage A, having a top B, a door C and a base D, a pair of bottoms E and E', a drip pan F and standards G. Standards G consist of vertical pipes 2, horizontal pipes 3 having unions 4 and mounted thereon angle irons 5 and 6. The angle irons 5 and 6 are jointed together as better illustrated in Figs. 5, 6 and 7. angle iron 5 abutting pipe 2 and angle iron 6 abutting the outer portion of angle iron 5, and angle iron 6 being countersunk to receive screws 7 when on opposed sides of post 2, and otherwise by bolts 7'. Screws 7 and bolts 7' serve to join both the angle irons. Cage A is received on angle iron 6 and pan F is received on angle iron 5. Cage A is made by rectangular straps 8 and 8' joined together at the top by U bars 9 and 9' and at the bottom by flat bars 10 and 10' and inclosed with a netting 11 at the top, and with a base member D, said base member preferably being of 22 gage galvanized iron in rectangular formation. Base member D is in the form of a pan partially bottomless extending upwardly in the bottom preferably about one third of its height. Base member D slides upon straps 10 and 10'. The door C is composed of screen affixed to a U member 12 and pivoted on a bolt 13 and when closed is held by a gravity latch 14. Thus when the door C is closed, top B is prevented from coming out.

When it is desired to remove the cage all that is necessary is to slide it outward upon angle bars 6 and the whole cage can be dipped in any desired solution and thereby afford a treatment for vermin, chinches, insects and such other treatment as it may be desired to afford on the removal of the cage.

It will be observed that the whole system is collapsible, as by the removal of pipes 2 from unions 4 and the removal of slides 5 and 6, the whole frame work becomes knocked down, and as illustrated in Fig. 3, the pan F is separable, the top B is removable and the base member D is also removable.

In breeding cages it is desired to have a wooden floor and it is obvious that as constructed the floor members E, which are illustrated in Figs. 2 and 4 as being screens, can be substituted by wood strips as shown in the right hand sections of Fig. 1. Thus the floors become interchangeable for either the usual cage or a breeding cage, and it is obvious that owing to this construction the floors can be removed for cleaning without disturbing the occupants of the cage. To remove the flooring of a cage without disturbing the occupant has heretofore occasioned a great deal of difficulty, and owing to the carelessness of the usual help obtainable, if any complications are afforded in a removable floor, it has proved impractical. The removal of the floor for the purpose of cleaning and other purposes in this invention is accomplished in the following manner: The floor is composed of two parts, one superposed on the other and as shown in Fig. 2 these parts are removable by pulling upon a little ear which projects, thus, either one of these may be removed while the animal is in the cage, and then when it is to be reinserted in the cage, the floor which has remained is merely lifted in the front slot and the floor which has been removed is inserted underneath this and it is obvious that the occupant of the cage will not be disturbed in any perceptible manner.

It is obvious further that the upper or main cage portion can be removed independently of the drip pan or that the drip plan can be removed independently of the upper cage. Usually when a screen bottom is used as is illustrated in Fig. 3, a board is placed in the back part of the cage extending about half way of the cage.

What I claim is:

1. An animal caging device comprising a drip pan, a cage, a track for said pan and cage, said track comprising a pair of superposed angle irons in contact with each other, one forming the track for said pan and the other the track for said cage and common means for securing said tracks.

2. In a caging device, a cage having a pair of wood bottoms and a pair of screen bottoms, one of each pair superposed on the other and means for holding said pairs to admit of one member of a pair being elevated to allow the insertion of the other member of said pair in its place and also to admit of the interchange of said pairs.

3. In a caging device, a knockdown frame comprising a plurality of standards, superposed angle irons connecting said standards and forming double tracks, common means for securing said angle irons together and to the standards, a plurality of collapsing cages, a plurality of interchangeable bottoms for each cage, and a plurality of drip pans, said cages and said drip pans being adapted to slide on said double tracks, respectively.

4. In a caging device, a plurality of vertical pipes, a plurality of horizontal pipes, unions connecting said pipes, a plurality of angle irons connecting said vertical pipes and forming auxiliary braces between said pipes, said angle irons including a double angle iron structure, one angle iron affixed to another to form a double slide, one of said slides for receiving a cage and the other of said slides for receiving a pan beneath said cage.

5. An animal caging device comprising a frame, a slidably removable cage, a slidably and independently removable pan beneath said cage, an interchangeable and slidably removable screen and wooden bottoms for said cage.

6. An animal caging device having a cage independently removable of a pan beneath said cage, interchangeable wood and screen floors for said cage, means including a slide in the bottom of said cage for receiving a floor, and a slot for the insertion of said floors, said slot of sufficient size to receive a plurality of either wood or screen floors as desired.

In testimony whereof I affix my signature.

GEORGE R. J. NEWMAN.